(12) United States Patent
Rupp

(10) Patent No.: US 10,252,229 B2
(45) Date of Patent: Apr. 9, 2019

(54) SYSTEM COMPRISING A PUMP ATTACHED TO A TANK CASING FOR MIXING A FLUID

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 0 days.

(21) Appl. No.: 15/640,109

(22) Filed: Jun. 30, 2017

(65) Prior Publication Data
US 2019/0001284 A1    Jan. 3, 2019

(51) Int. Cl.

| | | |
|---|---|---|
| *B01F 5/10* | (2006.01) | |
| *B01F 1/00* | (2006.01) | |
| *B01F 3/20* | (2006.01) | |
| *A23L 29/30* | (2016.01) | |
| *B01D 24/02* | (2006.01) | |
| *F04D 13/16* | (2006.01) | |
| *F16K 11/22* | (2006.01) | |
| *A23G 9/34* | (2006.01) | |
| *F04B 43/04* | (2006.01) | |
| *F04D 7/04* | (2006.01) | |

(52) U.S. Cl.
CPC .............. *B01F 5/102* (2013.01); *A23L 29/32* (2016.08); *B01D 24/02* (2013.01); *B01F 1/0022* (2013.01); *B01F 1/0038* (2013.01); *B01F 3/2057* (2013.01); *A23G 9/34* (2013.01); *A23V 2002/00* (2013.01); *B01D 2101/02* (2013.01); *B01F 2215/0014* (2013.01); *B01F 2215/0022* (2013.01); *F04B 43/04* (2013.01); *F04D 7/045* (2013.01); *F04D 13/16* (2013.01); *F16K 11/22* (2013.01)

(58) Field of Classification Search
None
See application file for complete search history.

(56) References Cited

U.S. PATENT DOCUMENTS

| 2,915,023 | A | * | 12/1959 | Rapaport | A23G 1/305 |
| | | | | | 118/13 |
| 3,251,602 | A | * | 5/1966 | Williams | F04B 15/08 |
| | | | | | 277/553 |
| 4,084,796 | A | * | 4/1978 | Krehbiel | B01F 3/0869 |
| | | | | | 366/137 |
| 4,448,539 | A | * | 5/1984 | Burgert | B01F 1/0022 |
| | | | | | 366/132 |

(Continued)

OTHER PUBLICATIONS

Espacenet. Machine translation and Disclosure of FR1366894. Retrieved Feb. 21, 2013. pp. 1-3. (Year: 2013).*

*Primary Examiner* — Abbas Rashid
(74) *Attorney, Agent, or Firm* — Terrence J. Edwards; TechLaw Ventures, PLLC

(57) ABSTRACT

The disclosure extends to systems, methods, and devices for mixing a fluid. The system comprises a tank conduit suspended in a tank for receiving a mixture comprising a liquid, wherein the tank holds the mixture. The system comprises a rigid casing configured to surround the tank and a pump attached to the rigid casing. The system includes a suction inlet and a discharge outlet attached to the pump, wherein the pump creates a negative pressure that draws the mixture into the pump through the suction inlet and the pump creates a positive pressure that dispels the mixture out of the pump through the discharge outlet.

12 Claims, 8 Drawing Sheets

(56) References Cited

U.S. PATENT DOCUMENTS

| | | | | |
|---|---|---|---|---|
| 5,596,953 | A * | 1/1997 | Hong | F24H 1/48 122/114 |
| 5,884,488 | A * | 3/1999 | Gram | F04B 15/08 417/901 |
| 6,149,026 | A * | 11/2000 | Manson | B65D 90/24 220/560.03 |
| 6,659,730 | B2 * | 12/2003 | Gram | F04B 15/08 417/53 |
| 7,404,666 | B2 * | 7/2008 | Tessien | B01J 19/008 366/114 |
| 8,096,700 | B2 * | 1/2012 | Tessien | F24V 99/00 366/114 |
| 8,763,565 | B2 * | 7/2014 | Dunn | F02M 21/0209 123/27 GE |
| 9,327,210 | B1 * | 5/2016 | Jones | B01D 11/0219 |
| 9,890,284 | B2 * | 2/2018 | Qiu | C08L 91/06 |
| 2012/0091022 | A1 * | 4/2012 | Nakagawa | A61K 31/496 206/438 |
| 2013/0242687 | A1 * | 9/2013 | Baltussen | B01F 3/1221 366/136 |
| 2015/0299466 | A1 * | 10/2015 | Qiu | C08L 91/06 106/498 |

* cited by examiner

SYSTEM COMPRISING A PUMP ATTACHED TO A TANK CASING FOR MIXING A FLUID

TECHNICAL FIELD

The disclosure relates generally to a mixing apparatus for use in mixing and preparing a solution, and more particularly, but not necessarily entirely, to an apparatus for mixing and preparing a viscous food grade mixture including a liquid base and at least one additional ingredient.

BACKGROUND

A variety of machines have been developed, described, and are widely known for creating or mixing a liquid solution. For industrial or large-scale food production purposes, such machines are often heavy, large, and difficult to move. Smaller machines intended for preparing small batches of a solution often do not have the capacity to mix a highly viscous solution or a solution wherein a large quantity of a solid must be dissolved in a relatively small volume. In the context of preparing water-based syrups having high quantities of sugar, mixing systems and apparatuses known in the art cannot efficiently prepare the syrup without large scale and cumbersome machinery. Importantly, such solutions comprising high quantities of sugar are very difficult if not impossible to mix by hand.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
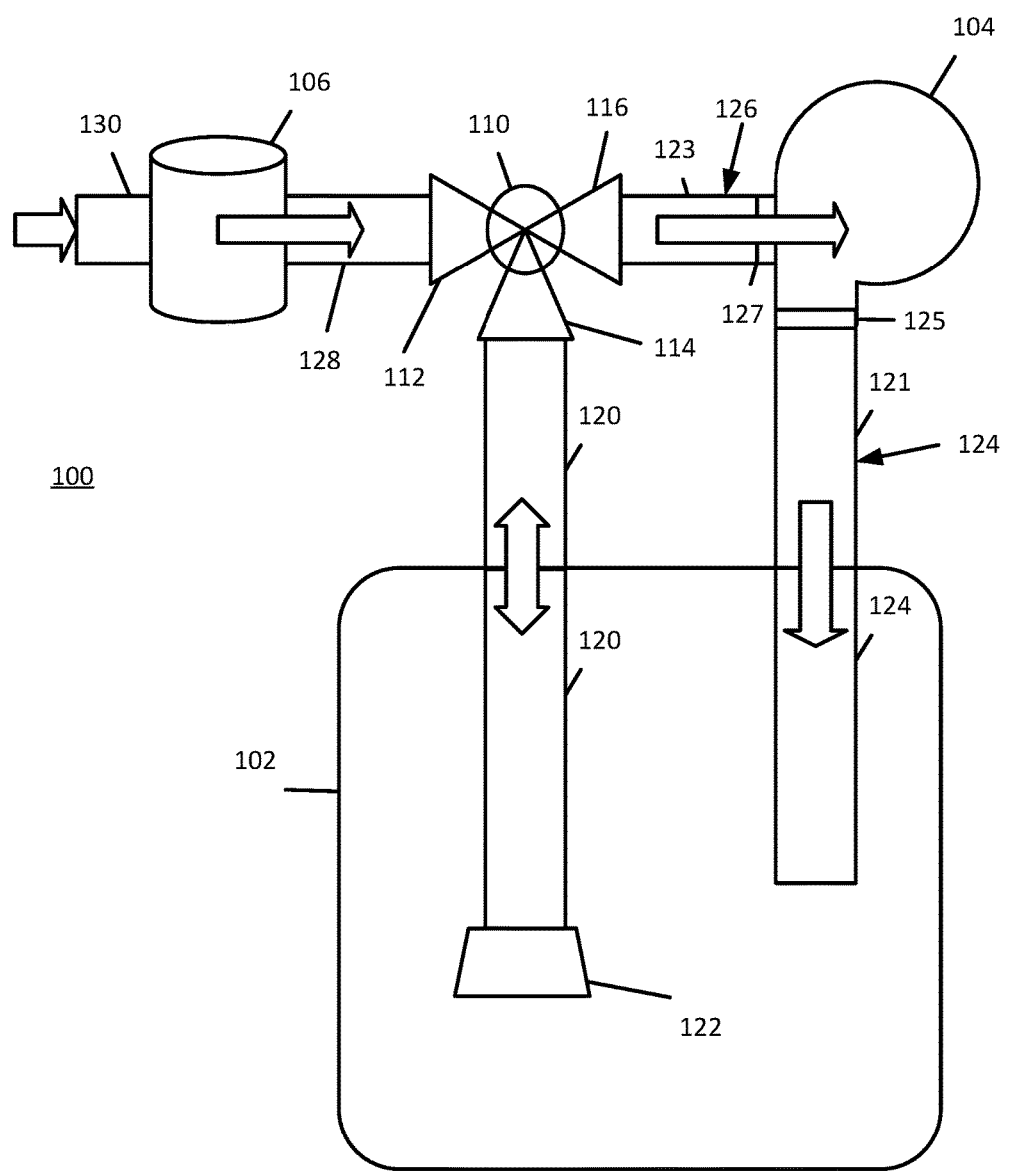
FIG. 1 illustrates a system diagram of an implementation of a system for mixing a solution in accordance with the teachings and principles of the disclosure.

A variety of machines have been developed, described, and are widely known for creating or processing solutions or liquid mixtures. Such devices are either incapable of mixing a solvent with a large quantity of a solid solute or the devices are too large, heavy, and cumbersome to easily transport from one location to another. In the context of providing flavored syrups for frozen confections such as snow cones, it is advantageous to make flavored syrups on-site where the frozen confections are dispersed. Pre-mixed flavored syrups can be heavy and costly to transport and can also consume a significant volume of space. Thus, it is advantageous to provide a system for preparing a flavored syrup on-site wherein a user may quickly mix water with, for example, a large quantity of sugar and a flavoring additive.

Further in the context of preparing flavored syrups for frozen confections, it can be time-consuming and difficult to provide large quantities of filtered water for preparing the food-grade mixtures. Thus, it may be advantageous to provide a system for mixing solutions wherein the system includes a common valve inlet for receiving a liquid solvent such as water.

As disclosed herein below, the disclosure provides an apparatus, system and method for preparing a mixture comprising a liquid base.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like, which has been included in the specification is not to be taken as an admission that any or all of these matters form part of the prior art base, or were common general knowledge in the field relevant to the disclosure as it existed before the priority date of each claim of this disclosure.

The disclosure extends to methods, systems, and devices for mixing a solution. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Before the methods, systems and devices for producing a shaved ice or snow cone product are disclosed and described, it is to be understood that this disclosure is not limited to the particular configurations, process steps, and materials disclosed herein as such configurations, process steps, and materials may vary somewhat. It is also to be understood that the terminology employed herein is used for describing particular implementations only and is not intended to be limiting since the scope of the disclosure will be limited only by the appended claims and equivalents thereof.

In describing and claiming the disclosed systems, methods, and devices, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

In an implementation, a system for mixing a solution is disclosed. The system includes a tank for holding a mixture comprising a liquid. The system includes a tank conduit suspended in the tank for receiving the mixture and a pump comprising a suction inlet and a discharge outlet. The pump creates a negative pressure that draws the mixture into the pump through the suction inlet and the pump creates a positive pressure that dispels the mixture out of the pump through the discharge outlet. The tank conduit is in fluid communication with the suction inlet such that the mixture flows through the tank conduit and the suction inlet when drawn into the pump. The mixture is discharged from the pump into the tank through the discharge outlet.

In an implementation, a system for mixing a solution is disclosed. The system includes an external fluid inlet for receiving a liquid and a tank for holding a mixture comprising the liquid. The system includes a tank conduit suspended in the tank that is configured to receive the liquid from the external fluid inlet and it is further configured to receive the mixture stored in the tank. The system includes a pump including a suction inlet and a discharge outlet, wherein the pump creates a negative pressure that draws the mixture into the pump through the suction inlet and wherein the pump creates a positive pressure that expels the mixture out of the pump through the discharge outlet. The system includes a three-way valve in fluid communication with the external fluid inlet, the pump suction inlet, and the tank conduit, wherein the three-way valve comprises a first position and a second position. When in the first position, the three-way valve receives the liquid from the external fluid inlet and blocks the liquid from flowing into the tank through the thank conduit. When in the second position, the three-way valve receives the mixture from the tank conduit when the pump creates a negative pressure that suctions the mixture into the pump.

In an implementation, the system includes a rigid casing that houses the mixing components of the system. The rigid casing may be placed over a standard sized tank, such as a ten-gallon plastic tank, and mix the solution deposited in the tank without being directly attached to the tank. In such an implementation, the system may be used to quickly mix a plurality of solutions and the solutions may then be stored in the same tank in which the solution was mixed.

Referring now to FIG. 1, there is illustrated a diagram of an implementation of a system 100 and method for mixing a solution. Illustrated in FIG. 1 is a plumbing network in fluid communication with a tank 102 configured to hold a solution. The system 100 includes a pump 104 and a filter 106 such as a particulate water filter 106. The system 100 includes a three-way valve 110 having a filter inlet valve 112, a tank conduit valve 114, and a pump outlet valve 116. The system includes an external fluid inlet 130, a filtration outlet 128, a tank conduit 120 including a tank conduit end piece 122, a suction inlet 126, and a discharge outlet 124.

The tank 102 is configured to hold the mixture throughout the mixing process and may hold the mixture for storage thereafter. The tank 102 includes an opening on the top side of the tank 102 wherein the tank conduit 120 and the discharge outlet 124 may enter the tank 102. The tank conduit 120 and the discharge outlet 124 may be suspended in the tank 102 such that the flow of fluid is not hampered by the tubing contacting a bottom of the tank 102. In an implementation, the tank 102 includes a lid that is removably attached to the tank 102 for storing the mixture in the tank 102. In an implementation, the tank is separate and distinct from the components that perform the mixing process. In such an implementation, a standard sized tank, such as a ten-gallon plastic tank, may be used in conjunction with the mixing components to mix the solution and may then be used to store the mixed solution. Such an implementation may be advantageous where a user wishes to prepare a plurality of mixtures and then store the mixtures in the same tank that was used for the mixing process.

In an implementation, the tank 102 is constructed of a rigid material such as a rigid plastic material. In an implementation, the tank 102 is translucent such that a user may view the fluid mixture within the tank throughout the mixing process. In such an implementation, a user may observe the mixing process and thereby discern when the mixing process is complete. In an implementation, the tank 102 is, for example, a five-gallon tank, a ten-gallon tank, a fifteen-gallon tank, a twenty-gallon tank, a twenty-five gallon tank, or a thirty-gallon tank. It will be understood that any tank size may be utilized without departing from the scope of the disclosure. In an implementation, the tank 102 is food-safe and resistant to corrosion or rust.

The pump 104 comprises a suction inlet 126 and a discharge outlet 124. The suction inlet 126 includes, for example, a suction inlet valve 127 and a suction inlet tubing or piping 123. The discharge outlet 124 includes, for example, a discharge outlet valve 125 and a discharge outlet tubing or piping 121.

In an implementation, the pump 104 is a centrifugal pump made in accordance with centrifugal pumps known in the art. In such an implementation, the solution is mixed as the solution is repeatedly suctioned into the pump and expelled out of the pump.

In an implementation, the pump 104 is a diaphragm pump or membrane pump. In an implementation, the pump 104 is a self-priming diaphragm pump comprising a 110-240 V electric motor such as any of the 4300 AC Series pumps produced by FLOJET™. In such an implementation, the pump 104 self-primes up to a 2.4 meter vertical lift and handles water-like and viscous liquids up to 250 centipoise.[41][42] The pump 104 includes a four-piston design capable of delivering high flow rates. The pump 104 further includes a quick connect plug-in for ease of use and installation.

When the pump 104 is a diaphragm or membrane pump, the pump 104 may include a motor and be classified as a positive displacement pump. In an implementation, the pump includes two diaphragms that reciprocate back and forth, creating a displacement chamber. The flexible diaphragms both draw in and dispel fluid through the pump. In an implementation when the pump 104 includes two diaphragms, the diaphragms will be on separate strokes, wherein one diaphragm is conducting a suction stroke while the other diaphragm is conducting a discharge stroke. This increases speed and pumping capacity and may less pump vibration and movement. The diaphragm or membrane pump is made in accordance with such pumps known in the art.

In an implementation, the pump 104 works on an air displacement principle such that a single diaphragm or membrane is mechanically pushed and pulled in and out of a pumping chamber. For example, when the diaphragm is extended, all of the air is forced out of the diaphragm chamber and the mixture is suctioned into the diaphragm chamber through the suction inlet 126. The mixture may then be discharged through the discharge outlet 124 when the diaphragm is collapsed.

It should be appreciated that the pump 104 may be any suitable pump known in the art. The pump 104 creates a negative pressure that draws the mixture into the pump and the pump 104 creates a positive pressure that expels the mixture out of the pump. When the mixture is suctioned into the pump, the mixture will travel up the tank conduit 120 and into the three-way valve 110. The mixture will enter the three-way valve through the tank conduit valve 114 and be guided by the three-way valve 110 to exit through the pump outlet valve 116. The mixture then flows through the suction inlet 126 including the suction inlet tubing or piping 123 and the suction inlet valve 127. The mixture then passes into the pump 104. The mixture is expelled from the pump 104 when the pump 104 creates a positive pressure to expel the mixture. The mixture flows through the discharge outlet 124 including through the discharge outlet valve 125 and the discharge outlet tubing or piping 124. The mixture is expelled back into the tank 102 where it may again be suctioned into the pump 102 by a negative pressure created by the pump 102.

In an implementation in which the pump 104 is a diaphragm or membrane pump, each of the suction inlet valve 127 and the discharge outlet valve 125 include a one-way valve. Only one of the suction inlet valve 127 and the discharge outlet valve 125 will be open at one time with the valves oscillating between an open position and a closed position.

It should be appreciated that the system 100 may operate by way of the Venturi effect, such that the mixture experiences a reduction in fluid pressure as it flows through the tank conduit 120. The mixture's velocity increases as it passes through the constricted area i.e. for example as it passes through the tank conduit 120, and the static pressure of the mixture therefore decreases in accordance with the principle of conservation of mechanical energy.

In an implementation, the filter 106 is configured to filter and purify an incoming liquid before it is introduced to the tank 102 or the pump 104. In an implementation, the filter 106 is a particulate filter such as a granular-activated carbon filter. The filter may be configured to remove a range of chemicals or tastes from incoming water and may be configured to remove very fine particulates. It should be appreciated that any suitable filter known in the art may be used.

In an implementation, the external inlet valve 130 includes a standard size inlet such as a ⅜-inch, ½-inch, ¾-inch, or ⅝-inch garden hose hookup. In such an implementation, a user may connect a standard size garden hose to the external inlet valve 130 and fill the tank quickly and conveniently. In the case of filling the tank with, for example, irrigation water, the filter 106 may be particularly important for ensuring the water is free of particulates or objectionable tastes. The external inlet valve 130 permits a user to conveniently fill the tank 102 in the same location where the system 100 will eventually mix the solution. This can be helpful in an implementation where the tank 102 is quite large and may be heavy and cumbersome to move after the tank 102 is filled with solution. It should be noted that the external inlet valve 130 may be any inlet valve known in the art and may be adjusted to suit different applications.

In an implementation, the tank conduit 120 is attached to a three-way valve 110 that is secured to an upper side of a rigid casing (see 224) such that the tank conduit 120 is suspended in the tank 102. The tank conduit 120 may include a tank conduit end 122 to improve the suction capabilities of the tank conduit 120 when the pump 104 is operational. The tank conduit 120 serves to suction the mixture from the tank 102 when the pump 104 creates a negative pressure to suction the mixture, and the tank conduit 120 further serves to deposit an incoming liquid into the tank.

The three-way valve 110 includes a filter inlet valve 112, a tank conduit valve 114, and a pump outlet valve 116. The filter inlet valve 112 receives a liquid from the external inlet valve 130 that has passed through the filter 106. The filter inlet valve 112 may have an open position and a closed position such that a liquid is permitted to pass through the three-way valve 110 and into the tank conduit 120, or such that the liquid is blocked from passing through the three-way valve 110. The tank conduit valve 114 is attached to the tank conduit 120 and may permit a newly added liquid to flow into the tank 102 or it may further receive a fluid mixture from the tank 102 when the pump 104 has created a negative pressure to suction the mixture out of the tank 102.

When the filter inlet valve 112 is in an open position, a liquid may flow through the external inlet valve 130, pass through the filter 106, and pass through the three-way valve 110 to be deposited into the tank 102 through the tank conduit 120. When the filter inlet valve 112 is in a closed position, a liquid may flow through the external inlet valve 130 and pass through the filter 106 but it will be blocked at the three-way valve 110 and will not be permitted to pass through the tank conduit 120 into the tank 102.

The pump outlet valve 116 is attached to the suction inlet 126 and is in fluid communication with the pump 104. The pump outlet valve 116 may have an open position and a closed position, such that a fluid is permitted to pass through the pump outlet valve 116 or such that a fluid is blocked from proceeding through the three-way valve 110 and out through the pump outlet valve 116. In an implementation, the pump outlet valve 116 is in a closed position when the filter inlet valve 112 is in an open position, and vice versa. Such an implementation prevents a liquid that is introduced through the external inlet valve 130 from flowing directly into the pump 104 before being deposited into the tank 102. Such an implementation further prevents a mixture that is suctioned out of the tank 102 from exiting the system through the external inlet valve 130.

In an implementation when the filter inlet valve 112 is in a closed position and the pump outlet valve 116 is in an open position, the mixture may be successfully suctioned into the pump 104. In such an implementation, the pump 104 creates a negative pressure to suction the mixture into the pump. The mixture is thereby suctioned into the tank conduit 120. According to the Venturi principle, the mixture will experience a decrease in pressure as it is suctioned into the tank conduit 120 and it will additionally experience an increased velocity. The mixture will enter the three-way valve 110 through the tank conduit valve 114 and the three-way valve 110 will permit the mixture to exit through the pump outlet valve 116. The three-way valve 110 will block the mixture from flowing through the filter inlet valve 112 in the opposite direction. The mixture may then flow through the suction inlet 126 and into the pump 104. The mixture may then be expelled by the pump 104 back into the tank 102 through the discharge outlet 124.

The discharge outlet 124 comprises a discharge outlet valve 125 and a discharge outlet tubing or piping 121. The discharge outlet 124 is attached to a discharge end of the pump 104. A mixture that has passed through the pump 104 will be expelled through the discharge outlet 124 and into the tank 102. That is, when the pump 104 is operational, a fluid will be suctioned out of the tank 102 through the tank conduit 120, pass through the three-way valve 110 and the pump 104, and then be expelled back into the tank through the discharge outlet 124. As such, a solution is effectively and efficiently mixed by churning the solution through the pump 104 and expelling the solution back into the tank 102.

As illustrated in FIG. 1, the directional flow of fluid is illustrated with block arrows. As indicated, a liquid may flow into the system at the external inlet valve 130. That same liquid may flow into the filter 106 and through the filtration outlet 128. As illustrated, a fluid may flow up the tank conduit 120 or down the tank conduit 120. In an implementation, a fluid flows up the tank conduit 120 only when the pump 104 creates a negative pressure and suctions the fluid into the pump 104. In an implementation, a fluid flows down the tank conduit 120 only when a liquid is introduced into the system through the external inlet valve 130. As illustrated, a fluid may flow from the three-way valve 110 into the pump 104 through the suction inlet 126. A fluid may further flow from the pump 104 into the tank 102 through the discharge outlet 124.

Figure 2:
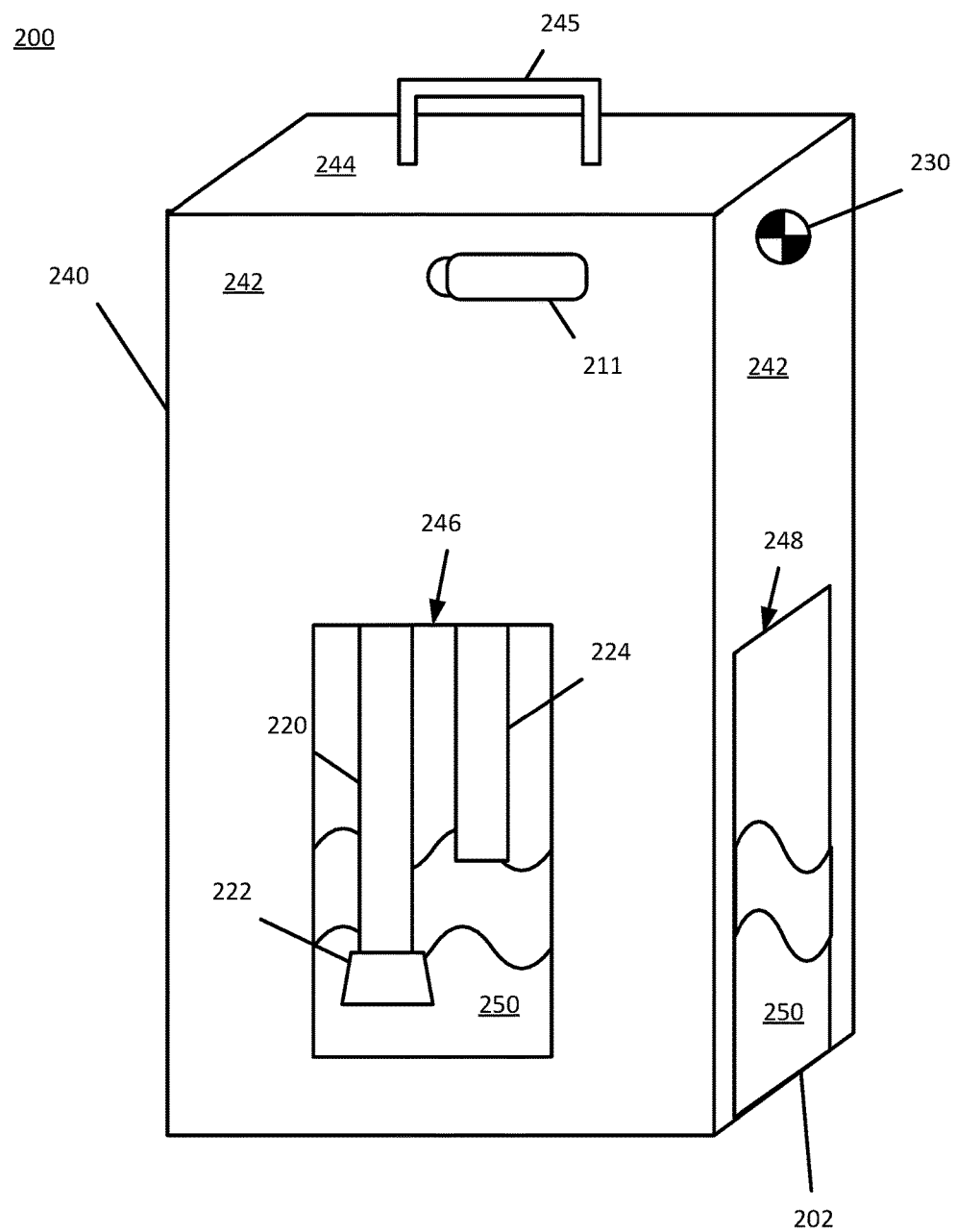
FIG. 2 illustrates a front perspective view of a system for mixing a solution in accordance with the teachings and principles of the disclosure.

Referring now to FIG. 2, a front perspective view of a system for mixing a fluid solution is shown. The system 200 includes a rigid casing 240 having a plurality of rigid casing sides 242 and a rigid casing upper side or top 244 having a handle 245. The rigid casing 240 includes a cutout 246, 248 that enables viewing of the tank 202 housed within the rigid casing 240. The tank conduit 220 and tank conduit end 222 along with the discharge outlet 224 are suspended in the tank 202 and may be viewed through the cutout 246, 248 in an implementation. Further, the mixture fluid 250 may be viewed through the cutout where the tank 202 is transparent or translucent. The external inlet valve 230 is attached to a side 242 of the tank. The system 200 further includes a lever 211 for operating the three-way valve 110 such as opening or closing the valve. In an implementation, the lever 211 may be turned ninety-degrees to open or close a valve in the three-way valve 110.

In an implementation, the rigid casing 240 does not have a bottom side or bottom panel. In such an implementation, the tank 202 is separate and distinct from the rigid casing. The tank 202 may be placed on a surface and the rigid casing 240 may then be placed over the tank such that the plurality of sides 242 surround the tank 202 and the upper side or top 244 is suspended over the tank 102. In such an implementation, the mixing components, including the tank conduit 220, the discharge outlet 224, and the pump 104 are secured to the rigid casing 240 either directly or indirectly, and the tank conduit 220 and discharge outlet 224 are then suspended in the tank 202. Ensuring that the tank conduit 220 and discharge outlet 224 are suspended in the tank 202, and do not make conduct with the bottom surface of the tank 202, helps ensure that fluid may flow freely into and/or out of the tank conduit 220 and discharge outlet 224.

In an implementation, the rigid casing 240 is constructed of a highly rigid material such as metal. In an implementation, the rigid casing 240 is quite heavy and may therefore withstand the vibrations caused by the pump 104 when the pump 104 is operational. In an implementation, it may be advantageous for the rigid casing 240 to be rigid and/or heavy such that the vibrations of the pump 104 do not cause the rigid casing 240 or the tank 102 to move or shake excessively. The rigid casing 240 may further include a dampening material for dampening any shaking or noise that may be caused by the pump 104.

In an implementation, the rigid casing 240 is constructed to fit snugly around the tank 202. In an implementation, the tank is a five-gallon tank and the rigid casing 240 may slide over and around the tank 202 such that the rigid casing 240 fits snugly around the tank 202. In an implementation, the rigid casing 240 is taller than the tank 202 such that the mixing components, including the pump 104 and water filter 106, may be attached to an upper interior surface of the rigid casing 240 and may operate without contacting the tank 202.

In an implementation, the rigid casing 240 includes a plurality of cutouts 246, 248, wherein the casing 240 includes one cutout on each vertical side of the casing 240. In an implementation, a cutout 246 has four sides such that it forms a complete rectangle within a vertical side of the casing 240. In an implementation, a cutout 248 extends to the bottom of the casing 240 such that the cutout 248 is formed of only three sides. In an implementation, it may be advantageous to include a four-sided cutout 246 and a three-sided cutout 248, such that the structural integrity of the casing 240 may be improved by a four-sided cutout and the viewing perspective may be improved by a three-sided cutout.

Figure 2A:
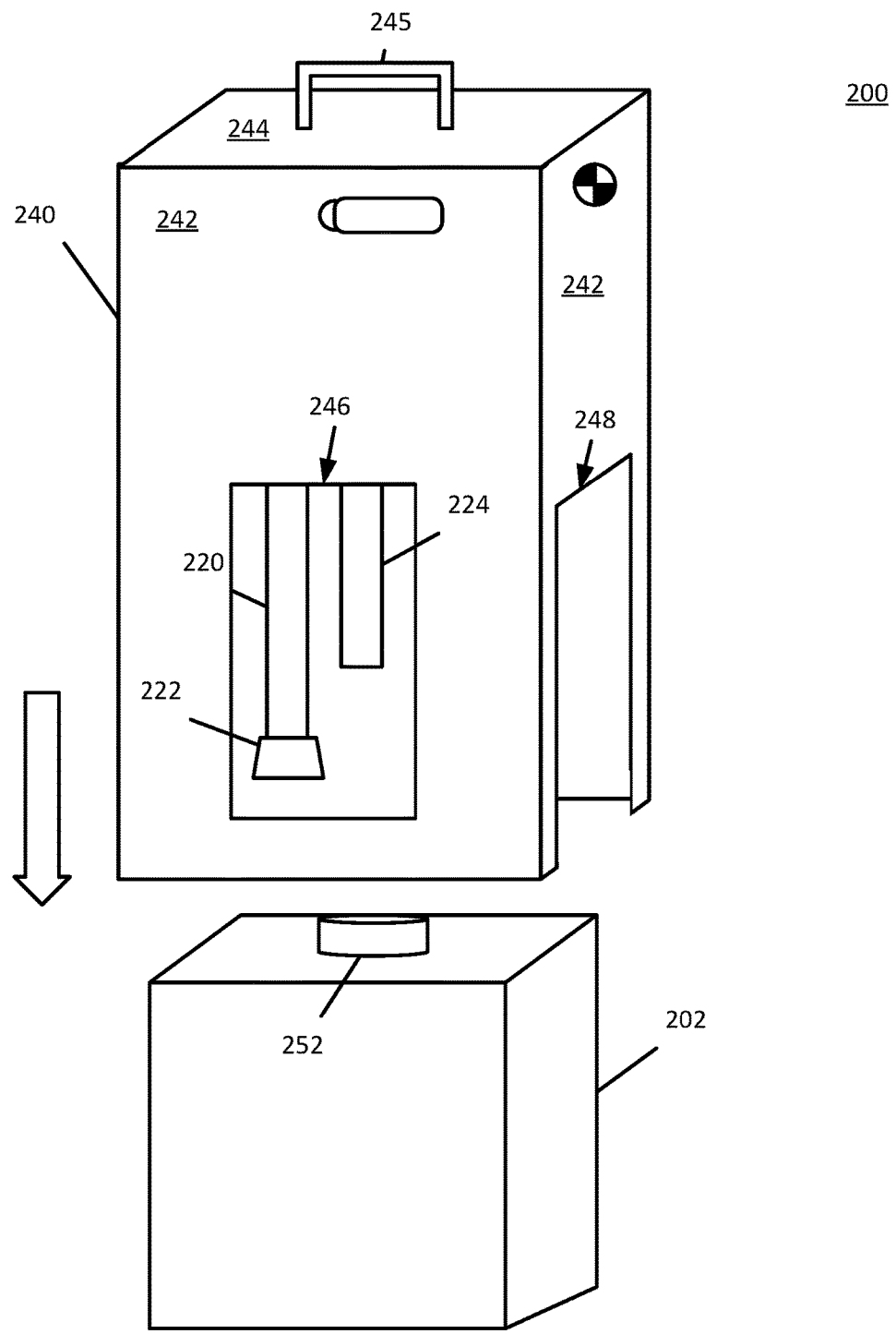
FIG. 2A illustrates a front perspective exploded view of a system for mixing a solution in accordance with the teachings and principles of the disclosure.

Referring to FIG. 2A, a perspective exploded view of a system 200 for mixing a fluid is shown. As illustrated in FIG. 2A, the rigid casing 240 is separate and distinct from the tank 202. The rigid casing 240 may be lowered to surround the tank 202 as depicted by the downward arrow in FIG. 2A. As depicted in FIG. 2, the rigid casing 240 includes a plurality of casing sides 242 and an upper side or top 244 having a handle 245. The rigid casing may include a plurality of cutouts 246, 248 that enable a user to view the tank 202 when the rigid casing 240 is lowered over the tank 202 and surrounds the tank 202. The rigid casing 240 includes a four-sided cutout 246 such that the cutout forms a window in a side 242 of the rigid casing 240. The rigid casing 240 includes a three-sided cutout 248 such that the cutout 248 is open to the bottom such that a user may view an entire length of the tank 202 when the rigid casing 240 surrounds the tank 202. The rigid casing 240 includes a tank conduit 220, tank conduit end 222, and discharge outlet 224, each visible through at least one cutout 246. In an implementation, the tank conduit 220 and discharge outlet 224 are attached to the valve and pump, respectively, (not shown) within the center region of the upper side or top 244 such that the tank conduit 220 and discharge outlet 224 may enter the tank 202 through a tank opening 252.

In an implementation, the rigid casing 240 is configured to tightly surround the tank 202 such that the inner sides of the rigid casing 240 contact the outer sides of the tank 202. In an implementation, the rigid casing is configured to surround the tank 202 such that the inner sides of the rigid casing 240 do not each contact the outer sides of the tank 202. In an implementation, the tank 202 includes an opening 252 that may comprise a lid or cap.

Figure 3:
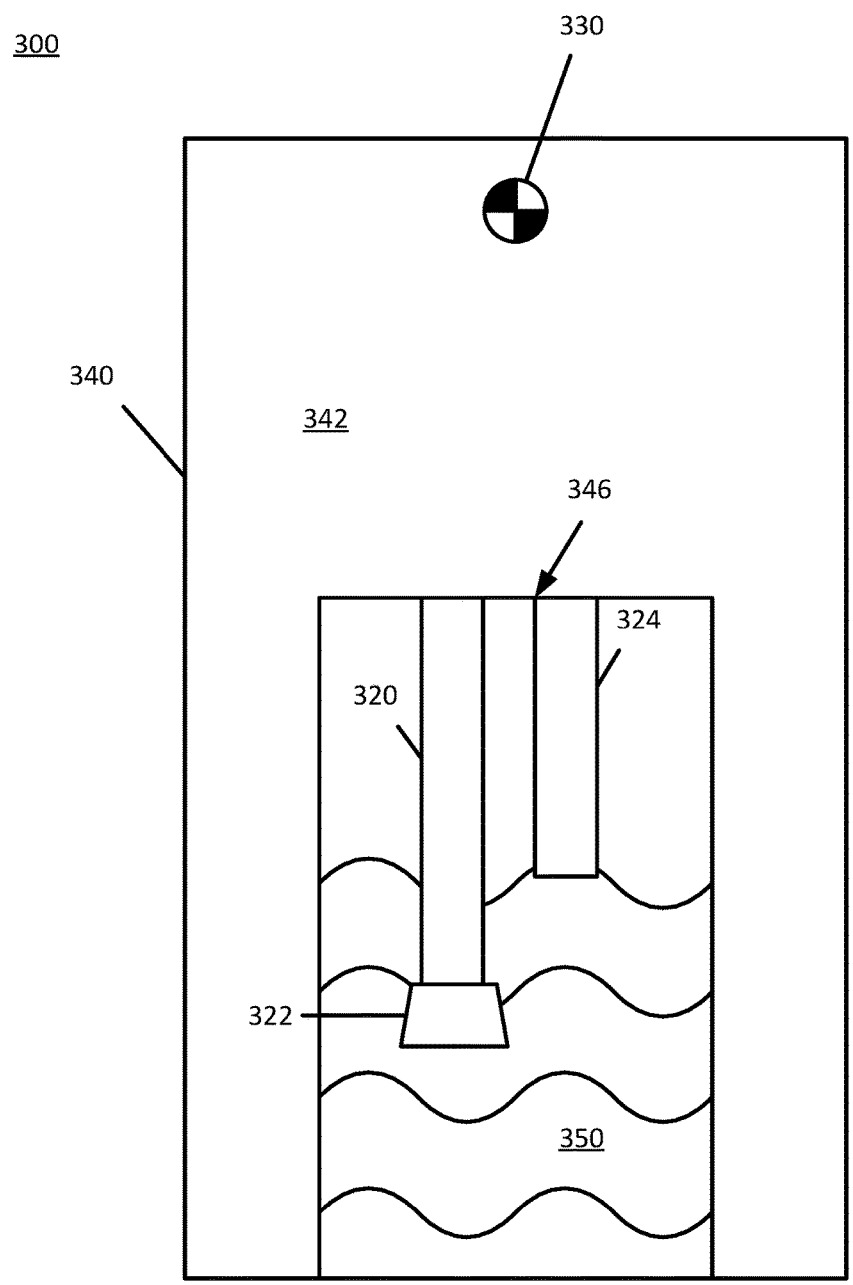
FIG. 3 illustrates a front view of a system for mixing a solution in accordance with the teachings and principles of the disclosure.

Referring now to FIG. 3, a front view of a system 300 for mixing a fluid is shown. The system 300 includes a rigid casing 340 including at least one rigid casing side 342. The system 300 includes an external inlet valve 330 that may receive a hose, for example, for filling a tank (see 102) housed within the rigid casing 340. The rigid casing 340 includes at least one cutout 346 configured to permit a viewer to observe the tank 102 housed within the rigid casing 340. The cutout 346 may have four sides as depicted in FIG. 2 or it may have three sides as depicted in FIG. 3, wherein the bottom edge of the cutout is an empty space. In such an implementation, the tank 102 and the rigid casing 340 may stand directly on a surface and the bottom of the tank 102 may be observed through the three-sided cutout 346. In an implementation when the tank 102 is translucent, the system 300 components within the tank 102 may be observed through the cutout 346 as depicted in FIG. 3. FIG. 3 illustrates wherein the fluid within the tank 350 may be observed through the three-sided cutout 346 and a translucent tank (see 102). System 300 components may also be viewed through the three-sided cutout 346 and the translucent tank, including, for example, the tank conduit 320 and tank conduit end 322 as well as the discharge outlet 324. This may be advantageous in an implementation where a user wishes to observe if the system 300 is functioning properly without needing to lift the rigid casing 340 off from the tank 102. A user may observe whether fluids or properly flowing into and out of the tank conduit 320 and the discharge outlet 324, for example, without disrupting the mixing process.

Figure 4:
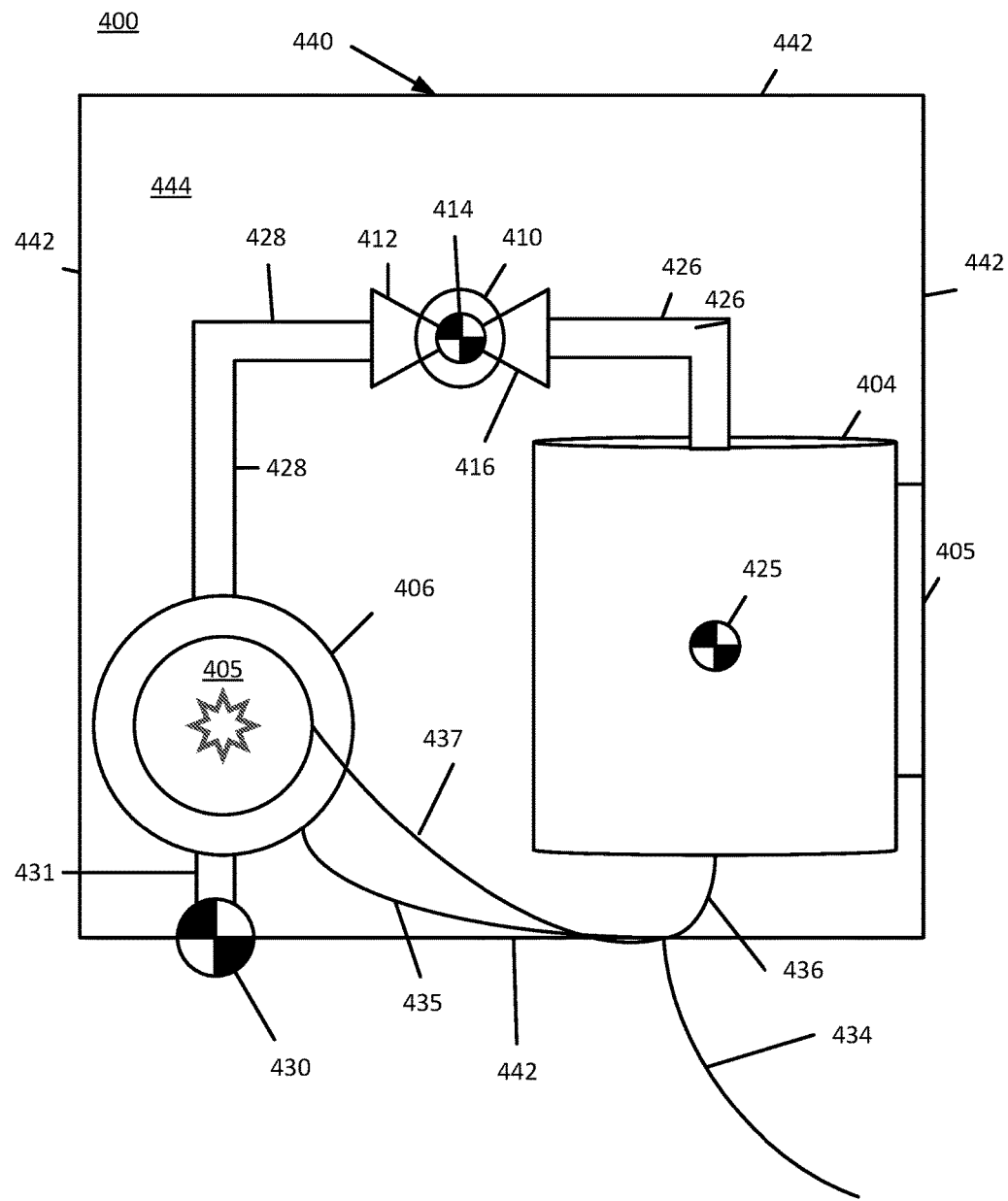
FIG. 4 illustrates an underside view of an interior of a system for mixing a solution in accordance with the teachings and principles of the disclosure.

Referring now to FIG. 4, an aerial view of an interior portion of a system 400 for mixing a fluid is shown. FIG. 4 illustrates the interior system 400 components housed within and/or attached to the rigid casing 440. Such components may be observed when the rigid casing 440 is set "upside down" such that the upper side or top 444 is located on the bottom. That is, FIG. 4 illustrates an aerial view into the interior of the rigid casing 440 when the top side (see 244) is oriented on the bottom.

The rigid casing 440 houses many of the mixing components of the system 400. The external inlet valve 430 is attached to the rigid casing 440 and may be attached to an external inlet tubing or piping 431 leading to the filter 406. A light 405 may be attached to an underside of the filter 406 such that the light shines directly down on to the tank 102 and illuminates the contents of the tank 102 when the rigid casing 440 is placed over and around the tank 102 during operation. The system 400 includes a filtration outlet 428 in fluid communication with the three-way valve 410 and attached at the filter inlet valve 412. The three-way valve 410 includes a tank conduit valve 414 attached to the tank conduit 120 (see FIG. 1). As illustrated in FIG. 4, when the rigid casing 440 is placed "upside down" such that the top side 244 is oriented at the bottom, the tank conduit valve 414 and the tank conduit 120 are pointed directly upward and parallel with the plurality of sides 442 of the rigid casing 440. That is, the tank conduit valve 414 as illustrated in FIG. 4 is directed out of the page.

The three-way valve 410 further includes a pump outlet valve 416 in fluid communication with the suction inlet 426 and the pump 404. The pump 404 may be attached to a side 442 of the rigid casing 440 with a pump attachment component 405. The pump 404 includes a discharge outlet valve 425 where fluid that has passed through the pump 404 may be discharged into the discharge outlet (see 124) and into the tank 102. As illustrated in FIG. 4 and similar to the tank conduit valve 414, the discharge outlet valve 425 is illustrated such that it is directed out of the page.

The system 400 may be powered by a 110-240 V electrical system. In an implementation, the system 400 includes a standard outlet cable 434 feeding electricity to a pump electrical cable 436, a filtration electrical cable 435, and a light electrical cable 437. In an implementation, the outlet cable 434 provides electricity only to the pump 404. In such an implementation, the filter 406 and/or the light 405 may be powered by battery power or may not require electricity. It should be appreciated that the system 400 may be powered by any suitable energy source, including for example, solar powered energy, battery powered energy, and energy that is manually provided by a user, such as a crank or the like.

Figure 5:
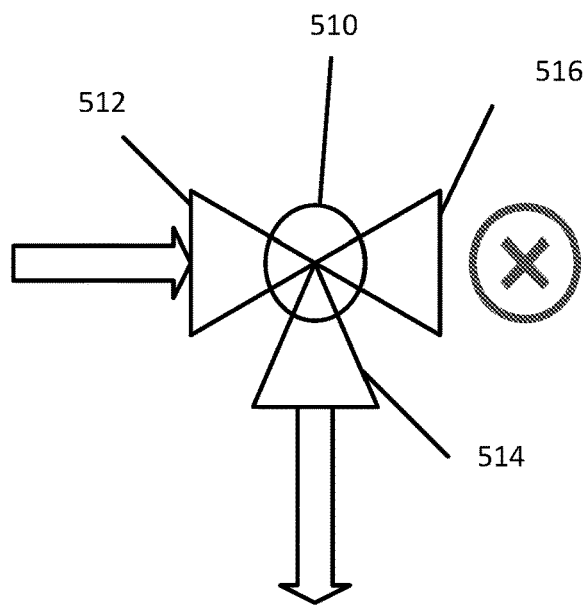
FIG. 5 illustrates a three-way valve in accordance with the teachings and principles of the disclosure.
Figure 6:
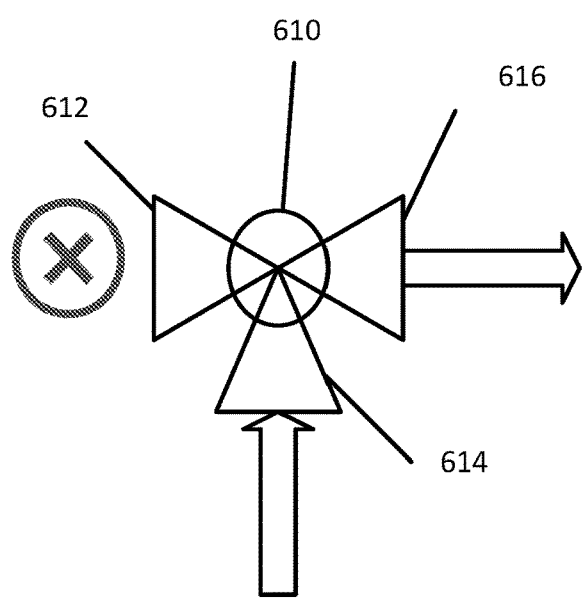
FIG. 6 illustrates a three-way valve in accordance with the teachings and principles of the disclosure.

Referring now to FIGS. 5-6, various implementations of a three-way valve 510, 610 are shown. Referring to FIG. 5, the pump outlet valve 516 is in a closed position and the filter inlet valve 512 and the tank conduit valve 514 are in the open position. Such an implementation may be useful when filling a tank 102 through an external inlet valve 130. In such an implementation, a fluid may enter through the filter inlet valve 512 and exit through the tank conduit valve 514 and ultimately be deposited into the tank 102. Referring to FIG. 6, the filter inlet valve 612 is in the closed position and the tank conduit valve 614 and pump outlet valve 616 are in the open position. Such an implementation may be useful when the pump 104 is operational and is suctioning a mixture out of the tank 102 and into the pump 104. In such an implementation, the mixture is suctioned by the pump 104 such that it enters through the tank conduit valve 614 and exits through the pump outlet valve 616, where the mixture will ultimately flow through the pump 104. It should be appreciated that various implementations of a three-way valve or other valve types may be implemented without departing from the scope of the disclosure.

Figure 7:
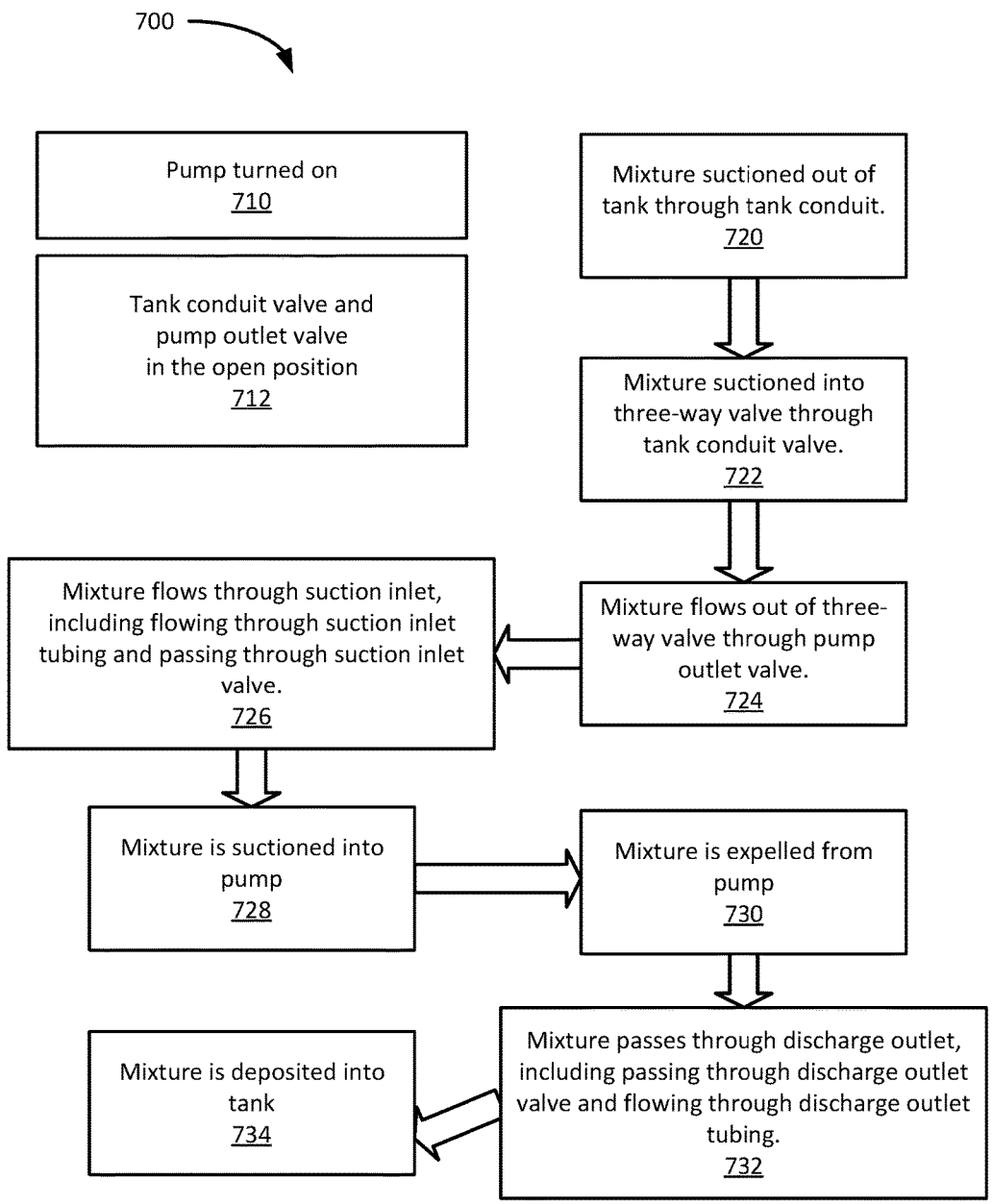
FIG. 7 illustrates a process for mixing a solution in accordance with the teachings and principles of the disclosure.

Referring now to FIG. 7, a flow chart diagram of a process 700 for mixing a solution by passing a mixture through a plumbing system is illustrated. The process 700 requires that the pump 104 is turned on 710 and that the tank conduit valve and the pump outlet valve are in the open position 712. The process 700 may be implemented to mix a solution comprising a liquid and at least one additional substance that are deposited in a tank 102. The process 700 beings and the mixture is suctioned out of the tank 102 through the tank conduit 120. The mixture is suctioned by a negative pressure created by the pump 104. The mixture is suctioned into a three-way valve by passing through the tank conduit into the tank conduit valve 722. The mixture flows out of the three-way valve through the pump outlet valve 724. The mixture flows through the suction inlet, including flowing through the suction inlet tubing and passing through the suction inlet valve 726. The mixture is suctioned into the pump 728. The mixture is expelled from the pump 730. The mixture is expelled from the pump when the pump creates a positive pressure causing the mixture to be expelled. The mixture passes through the discharge outlet, including passing through the discharge outlet valve and flowing through the discharge outlet tubing 732. The mixture is deposited into the tank 734. The process 700 may be repeated until the mixture is sufficiently and consistently mixed.

Figure 8:
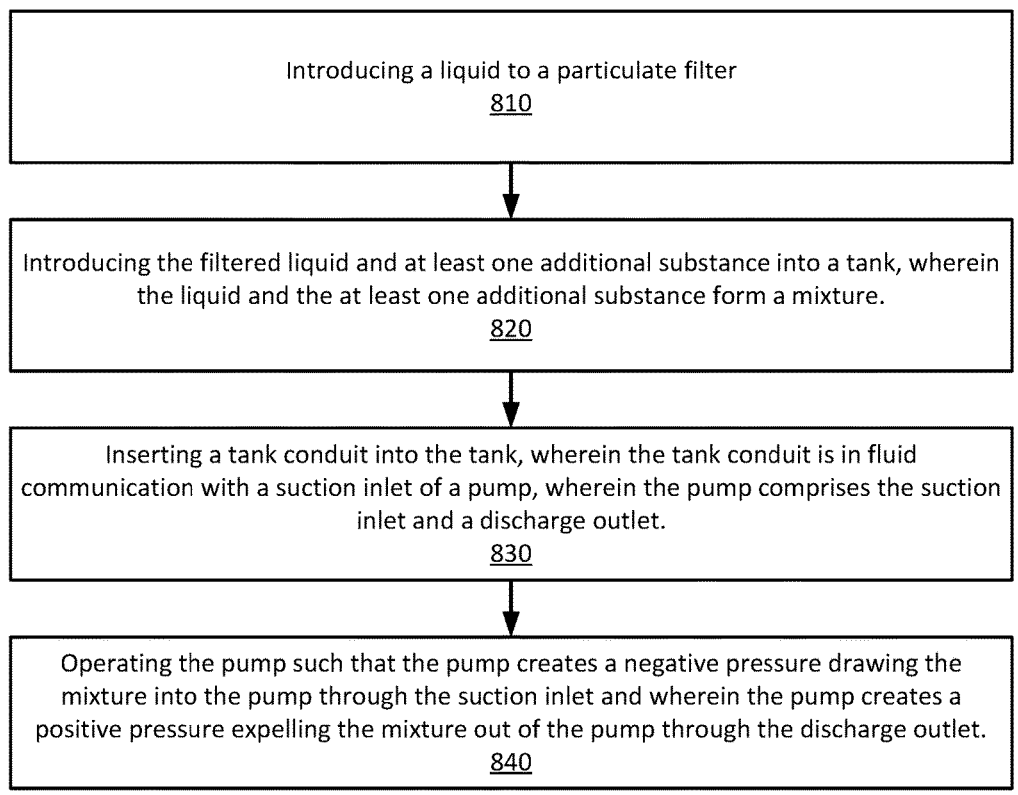
FIG. 8 illustrates a flow chart diagram of a method for mixing a solution in accordance with the teachings and principles of the disclosure.

Referring now to FIG. 8, a method 800 for mixing a solution is illustrated. The method 800 begins and a liquid is introduced to a particulate filter 810 where the liquid may be filtered to remove unwanted chemicals or tastes. The method 800 continues and the filtered liquid and at least one additional substance are introduced into a tank, wherein the liquid and the at least one additional substance form a mixture 820. The method 800 continues and a tank conduit is inserted into the tank, wherein the tank conduit is in fluid communication with a suction inlet of a pump, wherein the pump comprises the suction inlet and a discharge outlet 830. The method 800 continues and the pump is operated such that the pump creates a negative pressure drawing the mixture into the pump through the suction inlet and wherein the pump creates a positive pressure expelling the mixture out of the pump through the discharge outlet 840. The method 800 may be repeated until the mixture is sufficiently mixed.

Examples

The following examples pertain to further embodiments:

Example 1 is a system for mixing a fluid. The system includes a tank conduit suspended in a tank for receiving a mixture comprising a liquid, wherein the tank holds the mixture. The system includes a rigid casing comprising a plurality of sides configured to surround the tank. The system includes a pump attached to the rigid casing, the pump comprising a suction inlet and a discharge outlet, wherein the pump creates a negative pressure that draws the mixture into the pump through the suction inlet and the pump creates a positive pressure that dispels the mixture out of the pump through the discharge outlet. The system is such wherein the tank conduit is in fluid communication with the suction inlet such that the mixture flows through the tank conduit and the suction inlet when drawn into the pump; and wherein the mixture is discharged from the pump into the tank through the discharge outlet.

Example 2 is a system as in Example 1, further including an external fluid inlet for receiving a liquid, wherein the external fluid inlet is in fluid communication with the tank conduit.

Example 3 is a system as in any of Examples 1-2 further including a three-way valve in fluid communication with the external fluid inlet, the suction inlet, and the tank conduit.

Example 4 is a system as in Example 3, wherein the three-way valve comprises a first position and a second position, wherein the first position permits the liquid to flow through the three-way valve from the external fluid inlet to the tank conduit and wherein the second position blocks the liquid from flowing through the three-way valve from the external fluid inlet to the tank conduit.

Example 5 is a system as in Example 3 wherein the three-way valve permits the mixture to flow through the three-way valve from the tank conduit to the suction inlet.

Example 6 is a system as in any of Examples 1-5, further comprising a particulate filter for filtering a liquid before the liquid enters the tank.

Example 7 is a system as in any of Examples 1-6, further comprising a light.

Example 8 is a system as in Example 7, wherein the light is attached to an exterior of the particulate filter.

Example 9 is a system as in any of Examples 1-8, wherein the pump is a diaphragm pump.

Example 10 is a system as in any of Examples 1-9, further comprising a handle attached to a top of the rigid casing.

Example 11 is a system as in any of Examples 1-10, wherein the rigid casing comprises a plurality of sides and a top and does not comprise a bottom, and wherein the plurality of sides is configured to stand on a surface and surround the tank.

Example 12 is a system as in any of Examples 1-11, wherein the rigid casing comprises a cutout in a side of the rigid casing, wherein the cutout is configured to permit a user to view the tank when the rigid casing surrounds the tank.

Example 13 is a system as in any of Examples 1-12, wherein the rigid casing is constructed of metal.

Example 14 is a system as in any of Examples 1-13, wherein an interior surface of the rigid casing contacts an exterior surface of the tank when the rigid casing surrounds the tank.

Example 15 is a method for mixing a fluid. The method includes introducing a liquid and at least one additional substance into a tank, wherein the liquid and the at least one additional substance form a mixture. The method includes inserting a tank conduit into the tank, wherein the tank conduit is in fluid communication with a suction inlet of a pump, wherein the pump comprises the suction inlet and a discharge outlet. The method includes operating a three-way valve in fluid communication with the tank conduit and the suction inlet, such that the three-way valve permits the mixture to flow from the tank into the tank conduit, the three-way valve, and the suction inlet. The method includes operating the pump such that the pump creates a negative pressure drawing the mixture into the pump through the suction inlet and wherein the pump creates a positive pressure expelling the mixture out of the pump through the discharge outlet.

Example 16 is a method as in Example 15, further comprising placing a rigid casing comprising the tank conduit, the three-way valve, and the pump over the tank such that the rigid casing surrounds the tank.

Example 17 is a method as in any of Examples 15-16, further comprising introducing the liquid to a particulate filter such that the liquid is filtered before it is introduced to the tank.

Example 18 is a method as in any of Examples 15-17, wherein introducing the liquid to the tank comprises connecting a liquid source to an external fluid inlet attached to the system.

Example 19 is a method as in any of Examples 15-18, further comprising operating the three-way valve such that the three-way valve permits the liquid to flow into the tank from the external fluid inlet through the three-way valve and through the tank conduit.

Example 20 is a system for mixing a fluid. The system includes a rigid casing configured to surround a tank. The system includes an external fluid inlet attached to the rigid casing and configured to receive a liquid. The system includes a tank conduit within the rigid casing configured to receive the liquid from the external fluid inlet and configured to receive a mixture stored in the tank The system includes a pump comprising a suction inlet and a discharge outlet; wherein the pump creates a negative pressure that draws the mixture into the pump through the suction inlet and wherein the pump creates a positive pressure that expels the mixture out of the pump through the discharge outlet The system includes a three-way valve in fluid communication with the external fluid inlet, the pump suction inlet, and the tank conduit, wherein the three-way valve comprises a first position and a second position. The system is such that wherein the three-way valve receives the liquid from the external fluid inlet and permits the liquid to flow into the tank through the tank conduit when the three-way valve is in the first position, wherein the three-way valve receives the liquid from the external fluid inlet and blocks the liquid from flowing into the tank through the tank conduit when the three-way valve is in the second position, wherein the three-way valve receives the mixture from the tank conduit when the pump creates a negative pressure drawing the mixture into the pump, and wherein the three-way valve permits the mixture to flow into the pump through the suction inlet when the pump creates a negative pressure drawing the mixture into the pump.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single implementation for streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for mixing a fluid, comprising:
   a tank conduit suspended in a tank from a top of the tank for receiving a mixture comprising a liquid, wherein the tank holds the mixture;
   a rigid casing comprising a plurality of sides configured to surround the tank; and
   a pump attached to the rigid casing, the pump comprising a suction inlet and a discharge outlet which is suspended in the tank from the top of the tank, wherein the pump creates a negative pressure that draws the mixture into the pump through the suction inlet and the pump creates a positive pressure that dispels the mixture out of the pump through the discharge outlet;
   wherein the tank conduit is in fluid communication with the suction inlet such that the mixture flows through the tank conduit and the suction inlet when drawn into the pump;
   wherein the mixture is discharged from the pump into the tank through the discharge outlet;
   an external fluid inlet attached to the rigid casing for receiving the liquid, wherein the external fluid inlet is in fluid communication with the tank conduit;
   and further comprising a three-way valve in fluid communication with the external fluid inlet, the suction inlet, and the tank conduit.

2. The system of claim 1, wherein the three-way valve comprises a first position and a second position, wherein the first position permits the liquid to flow through the three-way valve from the external fluid inlet to the tank conduit and wherein the second position blocks the liquid from flowing through the three-way valve from the external fluid inlet to the tank conduit.

3. The system of claim 1, wherein the three-way valve permits the mixture to flow through the three-way valve from the tank conduit to the suction inlet.

4. The system of claim 1, further comprising a particulate filter.

5. The system of claim 1, further comprising a light.

6. The system of claim 5, wherein the light is attached to a particulate filter.

7. The system of claim 1, wherein the pump is a diaphragm pump.

8. The system of claim 1, further comprising a handle attached to a top of the rigid casing.

9. The system of claim 1, wherein the rigid casing comprises a plurality of sides, a top, and a bottom opening, and wherein the plurality of sides are configured to stand on a surface and surround the tank.

10. The system of claim 1, wherein the rigid casing comprises a cutout in a side of the rigid casing, wherein the cutout is configured to permit a user to view the tank when the rigid casing surrounds the tank.

11. The system of claim 1, wherein the rigid casing is constructed of metal.

12. The system of claim 1, wherein an interior surface of the rigid casing makes contact with an exterior surface of the tank when the rigid casing surrounds the tank.

* * * * *